United States Patent
Karrick, Jr.

(10) Patent No.: US 8,583,497 B2
(45) Date of Patent: Nov. 12, 2013

(54) SYSTEM FOR ELIMINATING COINS FROM CASH TRANSACTIONS

(76) Inventor: Robert A. Karrick, Jr., Toledo, OH (US)

( * ) Notice: Subject to any disclaimer, the term of this patent is extended or adjusted under 35 U.S.C. 154(b) by 0 days.

(21) Appl. No.: 13/469,484

(22) Filed: May 11, 2012

(65) Prior Publication Data

US 2012/0290419 A1 Nov. 15, 2012

Related U.S. Application Data (60) Provisional application No. 61/484,865, filed on May 11, 2011.

(51) Int. Cl.
*G06Q 20/00* (2012.01)
(52) U.S. Cl.
USPC .............. 705/17; 705/16; 705/30; 705/39
(58) Field of Classification Search
USPC ............................. 705/16, 17, 30, 39, 500
See application file for complete search history.

(56) References Cited

U.S. PATENT DOCUMENTS

| | | | |
|---|---|---|---|
| 5,869,826 A | 2/1999 | Eleftheriou | |
| 7,130,826 B1 | 10/2006 | Lenchner | |
| 7,284,696 B2 * | 10/2007 | Begola | 235/380 |
| 7,395,958 B2 | 7/2008 | Haber | |
| 2005/0160138 A1 * | 7/2005 | Ishidoshiro | 709/203 |
| 2006/0097039 A1 | 5/2006 | Begola | |
| 2007/0029378 A1 | 2/2007 | Begola | |
| 2007/0131760 A1 | 6/2007 | Aggarwal | |
| 2008/0004965 A1 * | 1/2008 | Park | 705/21 |
| 2009/0145958 A1 | 6/2009 | Stoutenburg et al. | |

* cited by examiner

*Primary Examiner* — Ryan Zeender
*Assistant Examiner* — Kristie A Mahone
(74) *Attorney, Agent, or Firm* — Fraser Clemens Martin & Miller LLC; Jacob M. Ward (57) ABSTRACT

A method and system for eliminating a need for coins in cash transactions in most currencies includes a comparison of a sum of a fractional dollar amount of an original transaction amount of a cash transaction between a merchant and a consumer plus a beginning value of a consumer storage device to a value of either 1.00 or 2.00. The amount of the value depends on whether a sum of credits and debits incurred by the merchant is greater or less than or equal to a sum of per transaction fees. The original transaction amount is decreased or increased to the next whole dollar amount, thereby providing a new transaction amount, if it is determined that the sum of the fractional dollar amount of the original transaction amount plus the beginning value of the consumer storage device is greater or less than, respectively, the value assigned.

23 Claims, 3 Drawing Sheets

SYSTEM FOR ELIMINATING COINS FROM CASH TRANSACTIONS

CROSS-REFERENCE TO RELATED APPLICATIONS

This application claims the benefit of U.S. Provisional Application No. 61/484,865, filed on May 11, 2011. The entire disclosure of the above application is hereby incorporated herein by reference.

FIELD OF THE INVENTION

The present invention relates generally to systems for commercial transactions and, more particularly, to systems for coinless commercial transactions.

BACKGROUND OF THE INVENTION

It is known that the United States Mint produced over nine billion coins (excluding the $1.00 coin) from Jan. 1, 2009 to Dec. 31, 2010. However, most consumers who still prefer to use cash do not carry coins with them, and instead will pay for purchases with paper currency. These consumers receive the change in coins. A majority of these coins are then accumulated in vehicles or at home, for example, in a change jar. Eventually the consumers will cash in the coins, often paying a fee to do so, or the coins go out-of-circulation.

The total value of the coins that are out-of-circulation at any given time is unknown, but the estimates are in the tens of millions of dollars. Many of the solutions that have been documented to account for the large number of out-of-circulation coins involve banking institutions, clearing houses, and the transmittal of data back and forth, and the related accounting procedures. These systems are all too complex and costly, especially when considering that the transaction amount could be one penny. One of the other disadvantages is the requirement for consumers to be identified by a storage card or device, further exposing them to identity theft or electronic fraud.

The use of fractional dollar value coins in a monetary system is inefficient, an unnecessary use of natural resources, detrimental to the environment, and a natural conduit for germs and diseases. Many attempts have been made to solve the coin problem but all have come up short; as evidenced by the continued use of coins having fractional dollar, or other currency, values.

A known system and method for conducting coinless transactions is described in U.S. Pat. No. 5,869,826 to Eleftheriou. The system of Eleftheriou uses a magnetic stripe data card to store a value of change with a maximum value of 0.99 of a whole dollar. The system either increases or decreases the value of the storage device depending on the fractional amount of the transaction and the current value of the storage device. The Eleftheriou method undesirably causes the merchants to experience unpredictable imbalances in their cash drawers. The amount of the imbalance will depend on the quantity and value of the coinless transactions, but is inevitable. The method of Eleftheriou also gives no consideration to the accounting of the change that is processed, and the merchant has no way of balancing their cash drawer.

There is a continuing need for a method and system that addresses the problems of the prior art by tracking a preset fee per transaction and a resettable cash balance, and setting parameters to control the direction of the credits and debits. Desirably, the method and system allows the merchant to balance their cash drawer and, barring any human error, the cash balance will exactly match the amount in the cash drawer when it is reconciled.

SUMMARY OF THE INVENTION

In concordance with the instant disclosure, a method and system that addresses the problems of the prior art by tracking a preset fee per transaction and a resettable cash balance, setting parameters to control the direction of the credits and debits, and allowing the merchant to balance their cash drawer and, barring any human error, the cash balance exactly matching the amount in the cash drawer when it is reconciled, is surprisingly discovered.

The method and system of the present disclosure may include a point of sale terminal with a connected (e.g., an RFID or NFC) reader/writer and a consumer storage device. The point of sale terminal tracks a running fee balance and a running cash balance. The running cash balance is compared to the running fee balance and a maximum value of either 1.00 or 2.00 is assigned to the consumer storage device. The point of sale terminal then reads the beginning value of the consumer storage device. The original transaction amount in a cash transaction is calculated by the point of sale terminal. The original transaction amount rounded up to the next whole dollar, minus the original transaction amount, determines a fractional dollar amount of the transaction. The fractional dollar amount is then added to the beginning value of the consumer storage device. If this total is less than the predetermined maximum value of the consumer storage device, the point of sale terminal and the consumer storage device are credited with an amount equal to the original transaction amount rounded up to the next whole dollar minus the original transaction amount. If the total is greater than the maximum value of the consumer storage device determined in the previous step, the merchant terminal and the consumer storage device are debited with an amount equal to the original transaction amount minus the original transaction amount rounded down to the next whole dollar. In each case the consumer is debited a transaction fee that is credited to the merchant.

In one embodiment, a method for eliminating an exchange of coins that represents a fractional dollar amount in a cash transaction between a consumer and a merchant includes the steps of providing a system for conducting a coinless transaction operated by the merchant, and providing a consumer storage device from the consumer.

Using the system for conducting the coinless transaction, a sum of the credits and debits incurred by the merchant is compared to a sum of per transaction fees. Based on the comparison, the method further includes one of the steps of assigning a first value if the sum of the credits and debits incurred by the merchant is greater than the sum of per transaction fees, and assigning a second value if the sum of the credits and debits incurred by the merchant tracked is less than or equal to the sum of per transaction fees. In illustrative embodiments, the first value is 1.00 and the second value is 2.00. It should be understood that one of ordinary skill in the art may select alternative values for the first value and the second value, as desired.

Using the system for conducting the coinless transaction, a sum of a fractional dollar amount of an original transaction amount of the cash transaction between the merchant and the consumer plus a beginning value of the consumer storage device to the one of the first value and the second value assigned are also compared. Based on the comparison, if it is determined that the sum of the fractional dollar amount of the original transaction amount plus the beginning value of the consumer storage device is greater than the value assigned, the method further includes the step of decreasing the original transaction amount to the next lowest whole dollar amount, thereby providing a new transaction amount. If it is determined that the sum of the fractional dollar amount of the original transaction amount plus the beginning value of the consumer storage device is less than or equal to the one of the first value and the second value assigned, the method further includes the step of increasing the original transaction amount to the next highest whole dollar amount, thereby providing the new transaction amount.

In another embodiment, a method for eliminating an exchange of coins that represent a fractional dollar amount in a cash transaction between a consumer and a merchant first includes the step of establishing an original transaction amount in the cash transaction. The fractional dollar amount of the original transaction amount is then determined. A beginning value on a consumer storage device provided by the consumer is also read. A sum of the fractional dollar amount of the original transaction amount plus the beginning value of the consumer storage device is then calculated. A sum of the credits and debits incurred by the merchant, and a sum of per transaction fees, are also tracked.

The sum of the credits and debits incurred by the merchant is compared to the sum of per transaction fees. A value of 1.00 is assigned if the sum of the credits and debits incurred by the merchant is greater than the sum of per transaction fees. A value of 2.00 is assigned if the sum of the credits and debits incurred by the merchant is less than or equal to the sum of per transaction fees.

The sum of the fractional dollar amount of the original transaction amount plus the beginning value of the consumer storage device is then compared to the value assigned. Where it is determined that the sum of the fractional dollar amount of the original transaction amount plus the beginning value of the consumer storage device is less than or equal to the value assigned, the beginning value of the consumer storage device is increased by an amount equal to the original transaction amount rounded up to the next whole dollar amount minus the original transaction amount, thereby providing an ending value of the consumer storage device. Where it is determined that the sum of the fractional dollar amount of the original transaction amount plus the beginning value of the consumer storage device is greater than the value assigned, the beginning value of the consumer storage device is decreased by an amount equal to the original transaction amount minus the original transaction amount rounded down to the next whole dollar amount, thereby providing the ending value of the consumer storage device.

Additionally, the original transaction amount is decreased to the next lowest whole dollar amount, thereby providing a new transaction amount, where it is determined that the sum of the fractional dollar amount of the original transaction amount plus the beginning value of the consumer storage device is greater than the value assigned. The original transaction amount is increased to the next highest whole dollar amount, thereby providing the new transaction amount, where it is determined that the sum of the fractional dollar amount of the original transaction amount plus the beginning value of the consumer storage device is less than or equal to the value assigned.

Also, where it is determined that the sum of the fractional dollar amount of the original transaction amount plus the beginning value of the consumer storage device is less than or equal to the value assigned, the sum of the credits and debits incurred by the merchant is increased by the amount equal to the original transaction amount rounded up to the next whole dollar amount minus the original transaction amount. Where it is determined that the sum of the fractional dollar amount of the original transaction amount plus the beginning value of the consumer storage device is greater than the value assigned, the sum of the credits and debits incurred by the merchant is decreased by an amount equal to the original transaction amount minus the original transaction amount rounded down to the next whole dollar amount.

Upon completion of the aforementioned steps, a new sum of the credits and debits incurred by the merchant is displayed. The new transaction amount is also displayed. The ending value is then written onto the consumer storage device, which is thereby readied for a new coinless transaction between the consumer and a merchant.

In a further embodiment, a system for conducting a coinless transaction between a consumer and a merchant includes a merchant terminal. The merchant terminal is configured for receiving an original transaction amount in a cash transaction. The merchant terminal includes a processor and a computer readable medium for receiving a beginning value stored on a consumer storage device, and calculating a new transaction amount and an ending value to be stored on the consumer storage device. The new transaction amount is a whole dollar amount. The system also has a display for displaying the new transaction amount. The system further includes a reader/writer device for outputting the ending value to the consumer storage device. The reader/writer device is in communication with the merchant terminal.

In an illustrative embodiment, a system according to the disclosure eliminates a need for fractional dollar coins in cash transactions by rounding the cash transactions up or down to the nearest dollar based on the outcome of an algorithm. The system utilizes a Radio Frequency Identification (RFID) or Near Field Communication (NFC) Consumer Storage Device (CSD) that stores a value of change. The CSD is read and written to by the RFID or NFC reader/writer that is connected to a point of sale (POS) terminal. The POS terminal has executable instructions on a computer readable storage medium and a processor that calculates the Fractional Dollar Amount (FDA) that is equal to the Original Transaction Amount (OTA) rounded up to the next whole dollar amount minus the OTA plus the Beginning Value (BV) of the CSD. The outcome of this calculation will either increase or decrease the transaction amount to the next whole dollar amount. This is the New Transaction Amount (NTA) that is then displayed by the POS terminal and paid by the consumer with no coins being exchanged. The difference between the OTA and the NTA is either debited or credited to the CSD, less a Transaction Fee (TF), with a matching debit or credit to the POS terminal. The TF is earned and retained by the merchant.

The POS terminal also tracks the running total of the TF, stores a Running Fee Balance (RFB), and then compares the RFB to the actual POS Running Cash Balance (RCB) related to the coinless transactions. If the RCB is less than the RFB, the higher maximum value of the CSD is used and causes the direction of the exchange to favor the merchant until the RCB becomes greater than the RFB. When the RCB is greater than the RFB, the lower maximum value of the consumer storage device will be used. By allowing the maximum value of the CSD to be variable, the system effectively controls the direction of the transactions and the RCB in the merchant's cash drawer.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE VARIABLES IN THE SPECIFICATION AND DRAWINGS

MT Merchant terminal.
POS Point of sale terminal.
CSD Consumer storage device.
RCB Running cash balance.
RFB Running fee balance.
RMB Resettable merchant balance.
OTA Original transaction amount.
OC Original amount of change due to a consumer at the completion of a cash transaction.
FDA Fractional dollar amount of the transaction.
FC Fractional amount of change due.
BV Beginning value of the consumer storage device.
FDABV The sum of FDA and BV.
FCBV The sum of FC and BV.
V1 A first value, for example, 1.00.
V2 A second value, for example, 2.00.
V3 The result of RCB>RFB, true or false.
V4 The result of RMB>RFB, true or false.
NTA New transaction amount to the consumer in a whole dollar amount.
NC New amount of change due to the consumer in a whole dollar amount.
EV Ending value of the consumer storage device.
TF Transaction fee.

DESCRIPTION OF THE PREFERRED EMBODIMENT

The following description is merely exemplary in nature and is not intended to limit the present disclosure, application, or uses. It should be understood that throughout the drawings, corresponding reference numerals also indicate like or corresponding parts and features. In respect of the methods disclosed, the order of the steps presented is exemplary in nature, and thus, is not necessary or critical.

Figure 1:
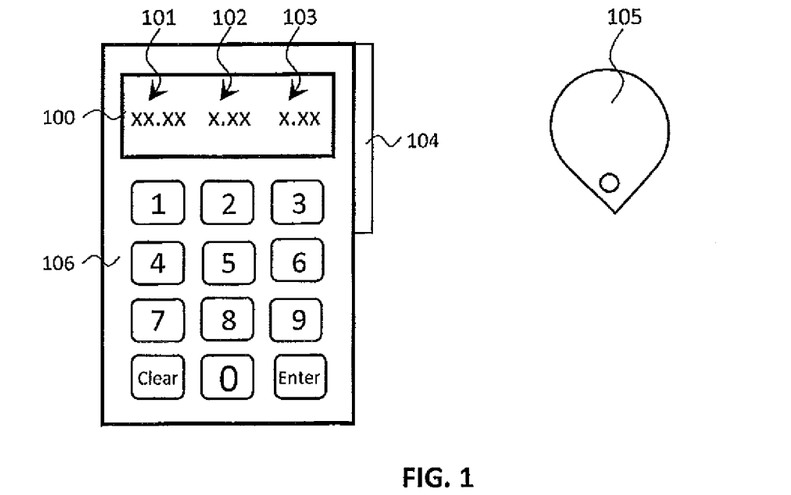
FIG. 1 is a schematic diagram showing a standalone merchant terminal and a consumer storage device, and the associated components thereof according to an embodiment of the present disclosure.

FIG. 1 shows a standalone or handheld merchant terminal (MT) capable of performing the necessary functions for a coinless transaction. The MT is equipped with a display 100 capable of displaying a running cash balance (RCB) 101, an original transaction amount (OTA) 102 from a cash transaction, and a new transaction amount (NTA) 103. The MT is further equipped with a Radio Frequency Identification (RFID) reader/writer 104 for the purpose of reading and writing to a passive RFID consumer storage device (CSD) 105. The CSD 105 may be a passive RFID tag that has a typical read write range, for example, of 1 to 3 inches. Other types of CSDs 105 operating on different principles may also be used within the scope of the disclosure.

The MT is further equipped with a numeric keypad 106 for the manual entry of the OTA. The MT also contains a microprocessor and the related electronic components such as a computer readable storage medium required having instructions for executing a process as described herein. This embodiment is preferred where cash transactions take place and Point of Sale (POS) terminals are not in use. Nonlimiting examples of this are swap meets and home deliveries. This embodiment may also be preferred in situations where integrating this coinless system with existing POS systems is impractical or cost prohibitive.

Figure 2:
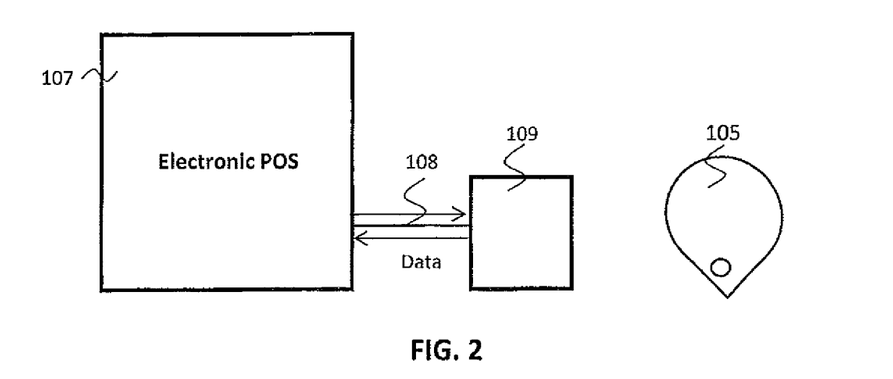
FIG. 2 is a schematic diagram showing a point of sale device such as a cash register with an integrated or built-in coinless system, and the associated components thereof according to another embodiment of the present disclosure.

FIG. 2 shows a POS terminal 107 than has been modified or upgraded with the necessary software and hardware to perform coinless transactions. This configuration utilizes a data cable 108 that connects the POS terminal 107 to a remote RFID reader/writer 109 to read and write to the CSD 105. In other embodiments, the POS terminal 107 is in communication with the remote RFID reader/writer 109 by other means such as wireless communication. It should be apparent to one of ordinary skill in the relevant art to incorporate a variety of standalone and integrated configurations similar to what is described here to carry out an operation of the present invention.

Figure 3:
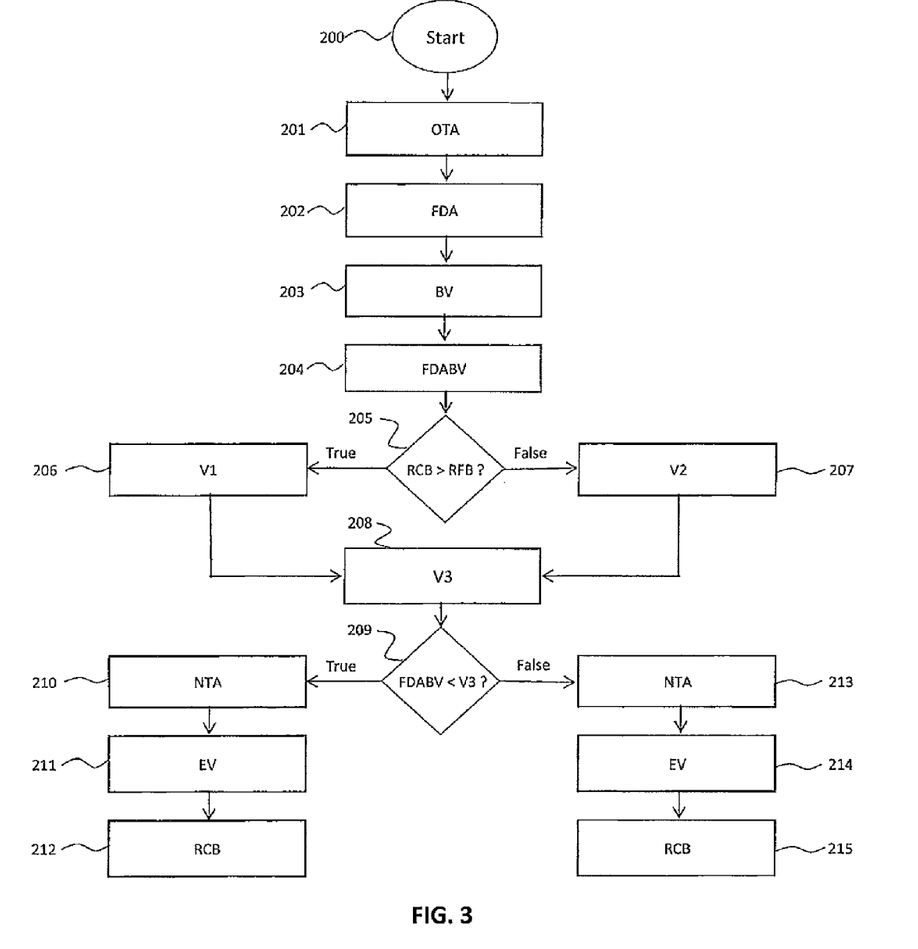
FIG. 3 is a flow diagram that schematically depicts how the method and system of the present disclosure processes a coinless transaction, according to one embodiment of the disclosure.

FIG. 3 is a schematic of the process from beginning to end of a coinless transaction in the preferred embodiment. For the purpose of simplifying the following process, the term "MT" will refer to both the standalone MT and the integrated POS embodiments previously described.

As shown in FIG. 3, the process begins after the total OTA has been established. The process starts with step 200 and proceeds to step 201. In step 201, the OTA is displayed on the display of the MT, and the process continues to step 202. In step 202, the OTA is rounded up to the next whole dollar amount minus the OTA, resulting in a Fractional Dollar Amount of the Transaction (FDA). The process then proceeds to step 203. In step 203, the MT reads a Beginning Value (BV) of the CSD and the process continues to step 204. In step 204, the sum of the FDA and the BV (FDA+BV) is calculated, with the result identified as (FDABV). The process then continues to step 205. In step 205, a Running Cash Balance (RCB) is compared to a Running Fee Balance (RFB). If it is determined that the RCB is greater than the RFB (i.e., true), the process continues to step 206. If it is determined in step 205 that the RCB is not greater than the RFB (i.e., false), the process proceeds to step 207.

In step 206, where step 205 was true, a value of 1.00 (V1) is assigned for the next step of the process. In step 207, where step 205 was false, a value of 2.00 (V2) is assigned for the next step of the process. The next step 208 in the process determines the value assigned in step 205, and is either a value of 1.00 or 2.00 (V3). The next step 209 compares the value of the FDABV and the V3.

If it is determined in step 209 that the FDABV is less than V3 (i.e., true), then the process proceeds to step 210. Step 210 calculates a New Transaction Amount to the Consumer in a Whole Dollar Amount (NTA) by rounding up the OTA to the next whole dollar. The NTA is displayed on the MT, and the process proceeds to step 211. In step 211, the value of the CSD is increased by amount equal to the NTA minus the OTA (NTA−OTA), less a Transaction Fee (TF), resulting in an Ending Value of the Consumer Storage Device (EV). The EV is written to the CSD, and the process proceeds to step 212. In step 212, the RCB is increased by an amount equal to the NTA minus the OTA (NTA−OTA).

If it is determined in step 209 that the FDABV is not less than V3 (i.e., false), then the process proceeds to step 213. Step 213 calculates the NTA by rounding down the OTA to the next whole dollar. The NTA is displayed on the MT and the process proceeds to step 214. In step 214, the value of the CSD is decreased by an amount equal to the OTA minus the NTA (OTA−NTA), less the TF resulting in the EV. The EV is written to the CSD, and the process proceeds to step 215. In step 215, the RCB is decreased by an amount equal to the OTA minus the NTA (OTA−NTA). This completes the coinless transaction.

Figure 4:
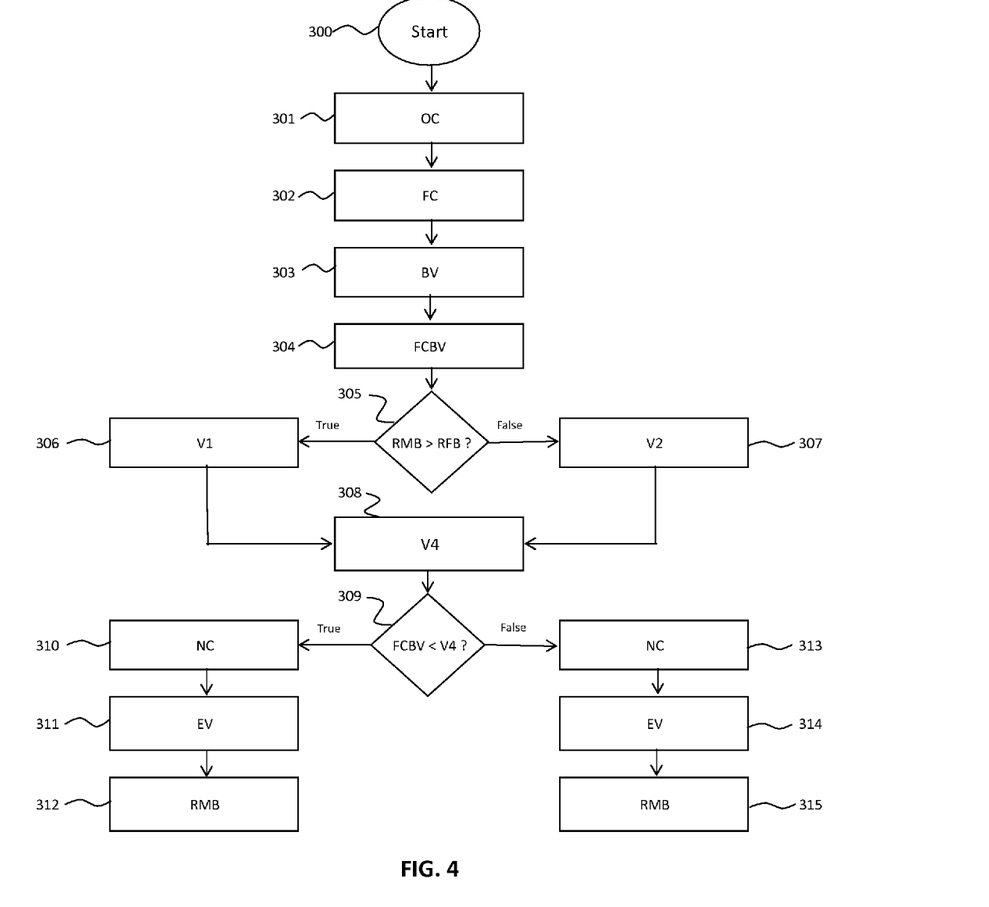
FIG. 4 is a flow diagram that schematically depicts how the method and system of the present disclosure processes a coinless transaction, according to another embodiment of the disclosure.

FIG. 4 is a schematic of the process from beginning to end of a coinless transaction according to another preferred embodiment. In the embodiment of FIG. 4, the standalone or handheld merchant terminal (MT) of FIGS. 1 and 2 may be capable of performing the necessary functions for a coinless transaction based on alternate considerations. For example, the display 100 is capable of displaying the resettable merchant balance (RMB) 101, the original amount of change (OC) due to the consumer 102 from a cash transaction and the new amount of change (NC) due 103 to the consumer from a cash transaction. The MT is further equipped with a numeric keypad 106 for the manual entry of the OC to the consumer.

The process depicted in FIG. 4 starts after a cash transaction has taken place where the amount of the sale including tax has been communicated to the consumer and the consumer has given the cashier an amount of cash greater than the total sale amount, the cashier has entered this as the amount tendered and the POS has determined the OC. The process starts with 300 and proceeds to 301. In step 301, the OC is either entered into the MT or the amount is received electronically from the POS and the process continues to step 302. In step 302, the OC is rounded down to the next whole dollar amount and this whole dollar amount is then subtracted from the OC resulting in the fractional amount of change due (FC) and the process proceeds to step 303. In step 303, the MT reads the beginning value of the CSD (BV) and continues to step 304. In step 304, the sum of FC plus BV is calculated and the result is (FCBV). The process then continues to step 305. In step 305, the resettable merchant balance (RMB) is compared to the resettable fee balance (RFB) and if it is determined that the RMB is greater than the RFB (true) it continues to step 306. If it is determined in step 305 that the RMB is not greater than the RFB (false) it proceeds to step 307.

In step 306, a value of 1.00 (V1) is assigned for the next step of the process. In step 307, a value of 2.00 (V2) is assigned for the next step of the process. The next step 308 in the process is the value determined in step 305 and is either a value of 1.00 or 2.00 (V4). The next step 309 compares the value of FCBV and V4.

If it is determined in step 309 that FCBV is less than V4 (true), the process proceeds to step 310. Step 310 calculates the new amount of change (NC) due by rounding down the OC due to the next whole dollar. This NC is displayed on the MT and proceeds to step 311. In step 311 the value of CSD is increased by FC, this ending value (EV) is written to the CSD and proceeds to step 312. In step 312, the RMB is increased by the FC.

If it is determined in step 309 that FCBV is not less than V4 (false), the process proceeds to step 313. Step 313 calculates the NC due by rounding up the OC due to the next whole dollar. The NC is displayed on the MT and proceeds to step 314. In step 314, the value of CSD is decreased by an amount equal to 1 minus FC, this EV is written to the CSD and proceeds to step 315. In step 315, the RMB is decreased by an amount equal to 1 minus FC. This completes the coinless transaction.

Advantageously, the present method and system makes it possible to eliminate the exchange of coins in a commercial cash transaction, and for the merchant to have an exact accounting of the amount that their cash drawers are over or under the total transaction amount based on a preset processing fee.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for eliminating an exchange of coins that represents a fractional dollar amount in a cash transaction between a consumer and a merchant, the method comprising the steps of:
   providing a system for conducting a coinless transaction operated by the merchant, the system including a processor;
   providing a consumer storage device from the consumer;
   using the system for conducting the coinless transaction, comparing by the processor a sum of credits and debits incurred by the merchant to a sum of per transaction fees;
   one of
      assigning a first value if the sum of the credits and debits incurred by the merchant is greater than the sum of per transaction fees, and
      assigning a second value if the sum of the credits and debits incurred by the merchant is less than or equal to the sum of per transaction fees; and
   using the system for conducting the coinless transaction, comparing by the processor a sum of a fractional dollar amount of an original transaction amount of the cash transaction between the merchant and the consumer plus a beginning value of the consumer storage device to the one of the first value and the second value assigned; and
   one of
      decreasing the original transaction amount to the next lowest whole dollar amount, thereby providing a new transaction amount, if it is determined that the sum of the fractional dollar amount of the original transaction amount plus the beginning value of the consumer storage device is greater than the one of the first value and the second value assigned, and
      increasing the original transaction amount to the next highest whole dollar amount, thereby providing the new transaction amount, if it is determined that the sum of the fractional dollar amount of the original transaction amount plus the beginning value of the consumer storage device is less than or equal to the one of the first value and the second value assigned.

2. The method of claim 1, further comprising the steps of:
   one of
      increasing the beginning value of the consumer storage device by an amount equal to the original transaction amount rounded up to the next whole dollar amount minus the original transaction amount, thereby providing an ending value of the consumer storage device, if it is determined that the sum of the fractional dollar amount of the original transaction amount plus the beginning value of the consumer storage device is less than or equal to the value assigned, and decreasing the beginning value of the consumer storage device by an amount equal to the original transaction amount minus the original transaction amount rounded down to the next whole dollar amount, thereby providing the ending value of the consumer storage device, if it is determined that the sum of the fractional dollar amount of the original transaction amount plus the beginning value of the consumer storage device is greater than the value assigned.

3. The method of claim 2, further comprising the steps of: using the system for conducting the coinless transaction, at least one of:
  displaying a new sum of the credits and debits incurred by the merchant;
  displaying the new transaction amount; and
  writing the ending value onto the consumer storage device.

4. A method for eliminating an exchange of coins that represent a fractional dollar amount in a cash transaction between a consumer and a merchant, the method comprising the steps of:
  a) establishing an original transaction amount in the cash transaction;
  b) determining the fractional dollar amount of the original transaction amount;
  c) reading a beginning value on a consumer storage device provided by the consumer;
  d) calculating a sum of the fractional dollar amount of the original transaction amount plus the beginning value of the consumer storage device;
  e) tracking a sum of the credits and debits incurred by the merchant;
  f) tracking a sum of per transaction fees;
  g) using a processor of a system for conducting a coinless transaction, comparing by the processor the sum of the credits and debits incurred by the merchant tracked in step e) to the sum of per transaction fees tracked in step f), and assigning a value of 1.00 if the sum of the credits and debits incurred by the merchant tracked in step e) is greater than the sum of per transaction fees tracked in step f), and assigning a value of 2.00 if the sum of the credits and debits incurred by the merchant tracked in step e) is less than or equal to the sum of per transaction fees tracked in step f);
  h) using the processor of the system for conducting the coinless transaction, comparing by the processor the sum of the fractional dollar amount of the original transaction amount plus the beginning value of the consumer storage device of step d) to the value assigned in step g);
  i) increasing the beginning value of the consumer storage device by an amount equal to the original transaction amount rounded up to the next whole dollar amount minus the original transaction amount, thereby providing an ending value of the consumer storage device, if it is determined in step h) that the sum of the fractional dollar amount of the original transaction amount plus the beginning value of the consumer storage device is less than or equal to the value assigned in step g);
  j) decreasing the beginning value of the consumer storage device by an amount equal to the original transaction amount minus the original transaction amount rounded down to the next whole dollar amount, thereby providing the ending value of the consumer storage device, if it is determined in step h) that the sum of the fractional dollar amount of the original transaction amount plus the beginning value of the consumer storage device is greater than the value assigned in step g);
  k) decreasing the original transaction amount to the next lowest whole dollar amount, thereby providing a new transaction amount, if it is determined in step h) that the sum of the fractional dollar amount of the original transaction amount plus the beginning value of the consumer storage device is greater than the value assigned in step g);
  l) increasing the original transaction amount to the next highest whole dollar amount, thereby providing the new transaction amount, if it is determined in step h) that the sum of the fractional dollar amount of the original transaction amount plus the beginning value of the consumer storage device is less than or equal to the value assigned in step g);
  m) increasing the sum of the credits and debits incurred by the merchant by the amount equal to the original transaction amount rounded up to the next whole dollar amount minus the original transaction amount if it is determined in step h) that the sum of the fractional dollar amount of the original transaction amount plus the beginning value of the consumer storage device is less than or equal to the value assigned in step g);
  n) decreasing the sum of the credits and debits incurred by the merchant by an amount equal to the original transaction amount minus the original transaction amount rounded down to the next whole dollar amount if it is determined in step h) that the sum of the fractional dollar amount of the original transaction amount plus the beginning value of the consumer storage device is greater than the value assigned in step g);
  o) displaying a new sum of the credits and debits incurred by the merchant;
  p) displaying the new transaction amount; and
  q) writing the ending value onto the consumer storage device.

5. The method of claim 1, further comprising of displaying the new transaction amount.

6. The method of claim 1, wherein the storage device is a passive Radio Frequency Identification device.

7. The method of claim 3, further comprising the following steps:
  r) reading the beginning value from a passive Radio Frequency Identification device; and
  s) writing the ending value to a passive Radio Frequency Identification device.

8. The method of claim 1, wherein the fractional dollar amount of the original transaction is equal to the original transaction amount rounded up to the next whole dollar amount minus the original transaction amount.

9. The method of claim 1, wherein the fractional dollar amount of the original transaction will vary with the currency but will be in a range between 0.01 and 0.99 of a whole dollar amount.

10. The method of claim 1, wherein the sum of the credits and debits incurred by the merchant in step e) is resettable to zero.

11. The method of claim 1, wherein the sum of per transaction fees is resettable to zero.

12. The method of claim 1, wherein a per transaction fee is preset and is in a range of 0.005 to 0.10 of a whole dollar amount per transaction.

13. The method of claim 1, wherein one of the first value and the second value is selected on a basis that causes a larger percentage of transactions to be rounded up, increasing a merchant cash balance.

14. A system for conducting a coinless transaction between a consumer and a merchant, comprising:

one of a merchant terminal and a point of sale terminal for receiving an original transaction amount in a cash transaction, the merchant terminal including a processor and a computer readable medium for receiving a beginning value stored on a consumer storage device and calculating a new transaction amount and an ending value to be stored on the consumer storage device, wherein the new transaction amount is a whole dollar amount;

a display for displaying the new transaction amount; and a reader/writer device for outputting the ending value to the consumer storage device, the reader/writer device in communication with the one of the merchant terminal and the point of sale terminal, wherein the processor is configured to perform the steps of 1) comparing a sum of credits and debits incurred by the merchant to a sum of per transaction fees, 2) assigning one of a first value and a second value based on the comparison of the sum of credits and debits incurred by the merchant to the sum of per transaction fees, 3) comparing a sum of a fractional dollar amount of the original transaction amount of the cash transaction between the merchant and the consumer plus the beginning value of the consumer storage device to the one of the first value and the second value assigned, and 4) one of decreasing the original transaction amount to the next lowest whole dollar amount and increasing the original transaction amount to the next highest whole dollar amount, thereby providing the new transaction amount, based on the comparison of the fractional dollar amount of the original transaction amount of the cash transaction between the merchant and the consumer plus the beginning value of the consumer storage device to the one of the first value and the second value assigned.

15. The system of claim 14, wherein the reader/writer device for outputting the ending value to a consumer storage device is an Radio Frequency Identification reader/writer device.

16. The system of claim 14, wherein the processor is further configured for tracking credits and debits incurred by the merchant, calculating a sum of credits and debits incurred by the merchant, resetting the sum of the credits and debits incurred by the merchant to zero, tracking a per transaction fee, calculating a sum of per transaction fees, and resetting a sum of per transaction fees to zero.

17. The system of claim 14, further including a numeric keypad for inputting the original transaction amount and means for receiving the original transaction amount, wherein the means for receiving the original transaction amount includes one of electronic data input, manual entry at the numeric keypad, a merchant cash register, and a point of sale device.

18. The system of claim 14, wherein the display is further configured for displaying a resettable cash balance, displaying the beginning consumer storage device value, and displaying the ending consumer storage device value.

19. The system of claim 14, wherein the consumer storage device is a passive Radio Frequency Identification storage device.

20. The system of claim 14, wherein the processor is a microcontroller and the computer readable medium is configured for storing fees of the merchant, credits of the merchant and debits of the merchant for recall by the processor.

21. A method for eliminating an exchange of coins that represents a fractional dollar amount in a cash transaction between a consumer and a merchant, the method comprising the steps of:

providing a system for conducting a coinless transaction operated by the merchant, the system including a processor;

providing a consumer storage device from the consumer;

using the processor of the system for conducting the coinless transaction, comparing by the processor a sum of credits and debits incurred by the merchant to a sum of per transaction fees;

one of
assigning a first value if the sum of the credits and debits incurred by the merchant is greater than the sum of per transaction fees, and
assigning a second value if the sum of the credits and debits incurred by the merchant is less than or equal to the sum of per transaction fees; and using the processor of the system for conducting the coinless transaction, comparing by the processor a sum of a fractional portion of an original amount of change due in the cash transaction between the merchant and the consumer plus a beginning value of the consumer storage device to the one of the first value and the second value assigned; and one of
decreasing the original amount of change due to the next lowest whole dollar amount, thereby providing a new amount of change due, if it is determined that the sum of the fractional portion of the original amount of change due plus the beginning value of the consumer storage device is less than or equal to the one of the first value and the second value assigned, and
increasing the original amount of change due to the next highest whole dollar amount, thereby providing the new amount of change due, if it is determined that the sum of the fractional portion of the original amount of change due plus the beginning value of the consumer storage device is greater than the one of the first value and the second value assigned.

22. A method for eliminating an exchange of coins that represent a fractional dollar amount in a cash transaction between a consumer and a merchant, the method comprising the steps of:

a) establishing an original amount of change due in the cash transaction;

b) determining the fractional portion of the original amount of change due;

c) reading a beginning value on a consumer storage device provided by the consumer;

d) calculating a sum of the fractional portion of the original amount of change due plus the beginning value of the consumer storage device;

e) tracking a sum of the credits and debits incurred by the merchant;

f) tracking a sum of per transaction fees;

g) using a processor of a system for conducting a coinless transaction, comparing by the processor the sum of the credits and debits incurred by the merchant tracked in step e) to the sum of per transaction fees tracked in step f), and assigning a value of 1.00 if the sum of the credits and debits incurred by the merchant tracked in step e) is greater than the sum of per transaction fees tracked in step f), and assigning a value of 2.00 if the sum of the credits and debits incurred by the merchant tracked in step e) is less than or equal to the sum of per transaction fees tracked in step f), h) using the processor of the system for conducting a coinless transaction, comparing by the processor the sum of the fractional portion of the original amount of change due plus the beginning value of the consumer storage device of step d) to the value assigned in step g);

i) increasing the beginning value of the consumer storage device by an amount equal to the fractional portion of the original amount of change due, thereby providing an ending value of the consumer storage device, if it is determined in step h) that the sum of the fractional portion of the original amount of change due plus the beginning value of the consumer storage device is less than or equal to the value assigned in step g);

j) decreasing the beginning value of the consumer storage device by an amount equal to the fractional portion of the original amount of change due, thereby providing the ending value of the consumer storage device, if it is determined in step h) that the sum of the fractional portion of the original amount of change due plus the beginning value of the consumer storage device is greater than the value assigned in step g);

k) decreasing the original amount of change due to the next lowest whole dollar amount, thereby providing a new amount of change due, if it is determined in step h) that the sum of the fractional portion of the original amount of change due plus the beginning value of the consumer storage device is less than or equal to the value assigned in step g);

l) increasing the original amount of change due to the next highest whole dollar amount, thereby providing the new amount of change due, if it is determined in step h) that the sum of the fractional portion of the original amount of change due plus the beginning value of the consumer storage device is greater than the value assigned in step g);

m) increasing the sum of the credits and debits incurred by the merchant by the amount equal to the fractional portion of the original amount of change due if it is determined in step h) that the sum of the fractional portion of the original amount of change due plus the beginning value of the consumer storage device is less than or equal to the value assigned in step g);

n) decreasing the sum of the credits and debits incurred by the merchant by an amount equal to the fractional portion of the original amount of change due if it is determined in step h) that the sum of the fractional portion of the original amount of change due plus the beginning value of the consumer storage device is greater than the value assigned in step g);

o) displaying a new sum of the credits and debits incurred by the merchant;

p) displaying the new amount of change due; and q) writing the ending value onto the consumer storage device.

23. A system for conducting a coinless transaction between a consumer and a merchant, comprising:

one of a merchant terminal and a point of sale terminal for receiving an original amount of change due in a cash transaction, the merchant terminal including a processor and a computer readable medium for receiving a beginning value stored on a consumer storage device and calculating a new amount of change due and an ending value to be stored on the consumer storage device, wherein the new amount of change due is a whole dollar amount;

a display for displaying the new amount of change due; and a reader/writer device for outputting the ending value to the consumer storage device, the reader/writer device in communication with the one of the merchant terminal and the point of sale terminal, wherein the processor is configured to perform the steps of 1) comparing a sum of credits and debits incurred by the merchant to a sum of per transaction fees, 2) assigning one of a first value and a second value based on the comparison of the sum of credits and debits incurred by the merchant to the sum of per transaction fees, 3) comparing a sum of a fractional portion of the original amount of change due in the cash transaction between the merchant and the consumer plus the beginning value of the consumer storage device to the one of the first value and the second value assigned, and 4) one of decreasing the original amount of change due to the next lowest whole dollar amount and increasing the original amount of change due to the next highest whole dollar amount, thereby providing the new amount of change due, based on the comparison of the fractional portion of the original amount of change due in the cash transaction between the merchant and the consumer plus the beginning value of the consumer storage device to the one of the first value and the second value assigned.

* * * * *

UNITED STATES PATENT AND TRADEMARK OFFICE
CERTIFICATE OF CORRECTION

PATENT NO.        : 8,583,497 B2
APPLICATION NO.   : 13/469484
DATED             : November 12, 2013
INVENTOR(S)       : Karrick, Jr.

Page 1 of 1

It is certified that error appears in the above-identified patent and that said Letters Patent is hereby corrected as shown below:

In the Claims at column 10, line 38, Claim 6, in the preamble, "The method of claim 1" should be changed to "The method of claim 4".

at column 10, line 40, Claim 7, in the preamble, "The method of claim 3" should be changed to "The method of claim 6", and
at column 10, line 42, Claim 7, the phrase "a passive" should be changed to "the passive", and
at column 10, line 44, Claim 7, the phrase "a passive" should be changed to "the passive".

Signed and Sealed this
Fourteenth Day of January, 2014

Michelle K. Lee
*Deputy Director of the United States Patent and Trademark Office*